Oct. 26, 1954 A. EISENKRAMER 2,692,983

REMOVABLE BEZEL AND SAFETY GLASS FOR TELEVISION RECEIVERS

Filed Dec. 28, 1951 2 Sheets-Sheet 1

INVENTOR
ARTHUR EISENKRAMER
BY Darby & Darby
ATTORNEY

INVENTOR
ARTHUR EISENKRAMER
BY Darby & Darby
ATTORNEY

Patented Oct. 26, 1954 2,692,983

UNITED STATES PATENT OFFICE 2,692,983

REMOVABLE BEZEL AND SAFETY GLASS FOR TELEVISION RECEIVERS

Arthur Eisenkramer, Westbury, N. Y., assignor to Emerson Radio and Phonograph Corporation, New York, N. Y., a corporation of New York Application December 28, 1951, Serial No. 263,824

7 Claims. (Cl. 340—367)

The present invention relates to television receivers and particularly to a removable bezel ring and safety glass for television receivers.

It is the present practice to provide television receivers with a safety glass which lies in front of the cathode ray tube in order to assure that any possible implosion of the tube will not result in physical injury to persons observing the receiver or in the vicinity thereof.

In present sets the safety glass is permanently fastened in the receiver cabinet and as a result if the face of the television receiving or cathode ray tube becomes dirtied in any manner, it is necessary to remove either the entire receiver chassis or the cathode ray tube in order to clean the face of the tube.

By my invention this situation is overcome. I provide a bezel ring which is removably fastened to the television cabinet and clips hidden by this ring hold the safety glass in position in front of the cathode ray tube. Therefore, in order to clean the face of the tube it is only necessary to remove the bezel, exposing the clips which can then be turned aside so that the safety glass can be removed and the tube face cleaned.

It is an object of my invention to provide a removable bezel ring and safety glass for a television receiving set.

It is another object of my invention to provide such a removable bezel ring which can be removed quickly and without tools.

It is another object of my invention to provide a television receiver "front" of the character above-described which may be economically and rapidly manufactured and which may be readily installed in the television receiver.

Other objects and features of the invention will be apparent when the following description is considered in connection with the annexed drawings, in which, Figure 1 is a front elevation of a television receiver having a bezel ring of my invention in place thereon;

Figure 1:
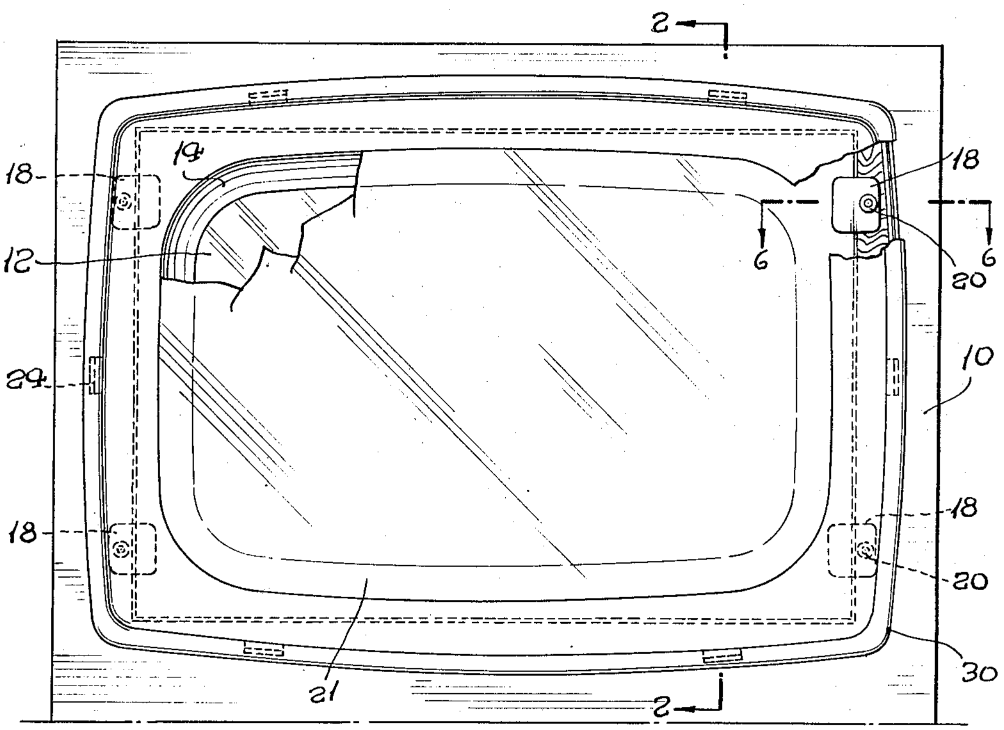
Figures 2, 6, 7, 8, 9:
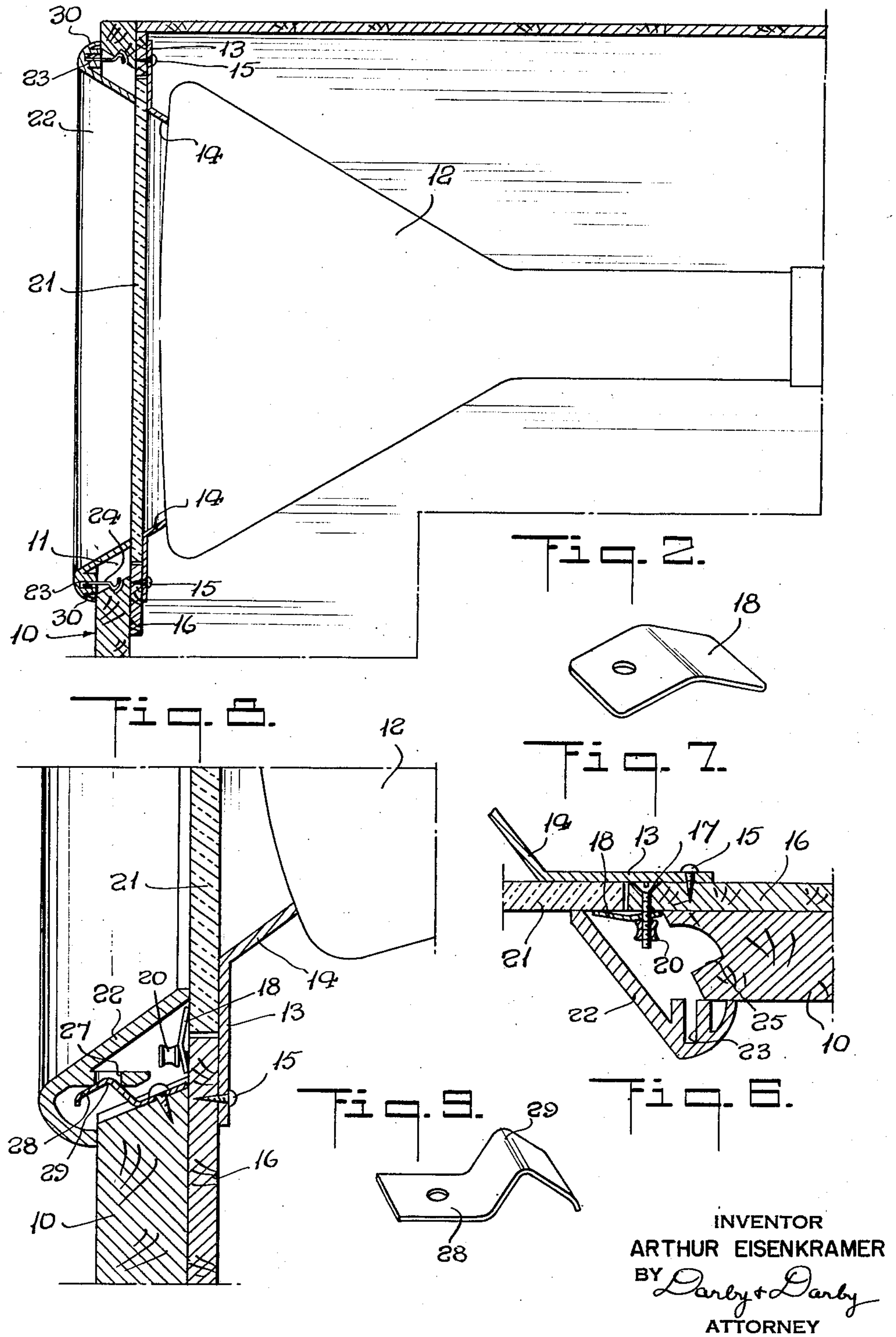
Figure 2 is a cross-sectional view of the receiver of Figure 1, the view being taken on the plane of the line 2—2 of Figure 1.
Figure 6 is a fragmentary cross-sectional view taken on the plane of the line 6—6 of Figure 1 showing particularly the manner in which the safety glass panel is held in position in front of the cathode ray receiving tube.
Figure 7 is an enlarged perspective view of a safety glass retaining clip such as that shown on a smaller scale in Figures 6 and 8.
Figure 8 is an enlarged fragmentary cross-sectional view of a modified form of bezel ring and cooperating parts.
Figure 9 is an enlarged perspective view of a bezel ring retaining clip of the type shown in Figure 8.

Referring now to the drawings, and particularly to Figures 1 and 2, there is shown at 10 a television receiver cabinet of usual form having an opening 11 in the forward face thereof through which the image on the television receiver tube 12 is to be viewed. In accordance with my invention there is mounted on the inside of the cabinet front a generally rectangular picture tube mask 13 of the usual type used in television receivers, which mask is fastened to the cabinet by wood screws 15 or other suitable means to an inwardly projecting lip 14 on the cabinet. Because this mask is mounted permanently in such a position that only the face of the picture tube is accessible from the outside of the cabinet, accidental contact with any of the electrical or mechanical components of the television receiver while cleaning the picture tube face is completely avoided. As is seen particularly in Figure 6, studs 17 extend through the lip 16 of the cabinet 10, these studs having clips 18 mounted thereon and held in place by the nuts 20. The usual safety glass panel 21 is held in position between picture tube mask 13 and the clips 18.

Figure 5:
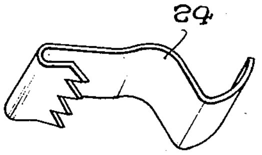
Figure 5 is an enlarged perspective view of one of the bezel ring maintaining clips shown in Figures 2, 3 and 4.
Figure 3:
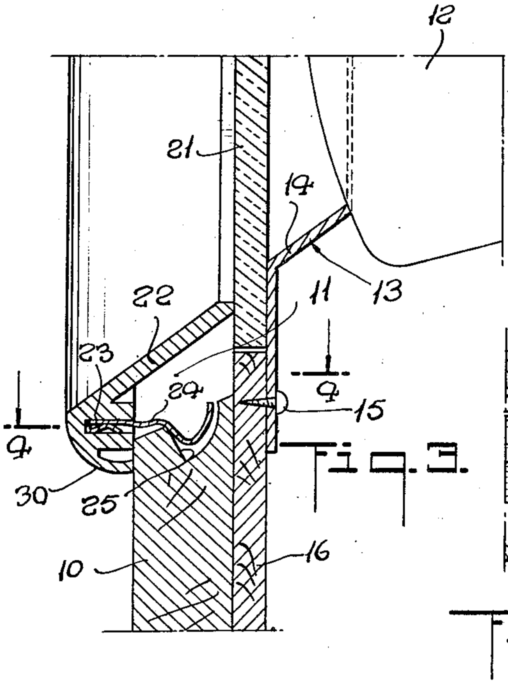
Figure 3 is an enlarged fragmentary cross-sectional view of a portion of Figure 2 showing the details of my bezel ring mounting.
Figure 4:
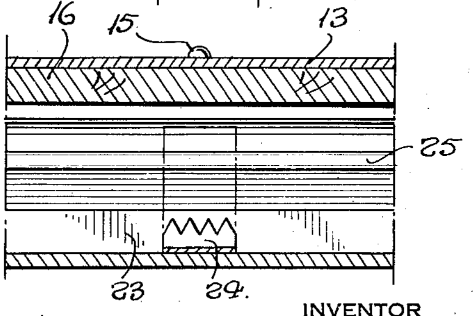
Figure 4 is a fragmentary cross-sectional view taken on the plane of the line 4—4 of Figure 3.

A face bezel 22 is provided in order to give the cabinet a finished appearance. In one form of my invention as is shown in Figure 3 this face bezel ring is made of plastic material and has molded therein grooves 23 into which resilient clips 24 of the type shown in Figure 5 are inserted. The edges of the cabinet opening 11 have notches, such as shown at 25, formed therein at spaced points corresponding to the locations of the clips 24, the bezel ring 22 being placed into position by simply inserting the clips 24 in the grooves 23, then pushing the bezel ring into the opening 11, the right hand portions of clips 23, as seen in Figure 3, then springing into the notches 25 in the edges of the face opening and holding the face bezel ring 22 in its adjusted position. If desired a continuous groove may replace notches 25.

As will be clear from the above description, the mode of disassembling the parts mentioned in order to clean the face of the television tube or for any other purpose is simply to spring the clips 24 out of their cooperating notches 25 by exerting a pull on the bezel ring 22. In order that the ring 22 may readily be pulled outwardly the outer rim 30 thereof which, throughout most of its periphery seats against the front face of the cabinet 10, is provided with an access notch on either side thus providing spaces into which fingers may be inserted to permit prying the bezel ring from the cabinet. This permits removal of the bezel ring 22 and exposes the nuts 20 to view. These nuts may then be loosened and the clips 18 rotated thereby freeing the safety glass panel 21 which can then be removed. The face of the tube is now exposed and may be cleaned.

In Figure 8 there is shown a modification of the mode of holding the face bezel ring 22 in place. In this instance an inwardly projecting rim 26 formed integrally with the plastic ring 22 is provided with apertures 27 at spaced points therealong. At corresponding points on the edge of cabinet opening 11 clips 28 of the form shown in Figure 9 are mounted, the clips being formed of spring material so that the knee portions 29 thereof bear against the sides of the openings 27 and hold the bezel ring 22 in position.

In the form of my invention shown in Figure 8 the rear picture tube mask 13 and the safety glass holders comprising the clips 18 and studs 17 and nuts 20 are identical with those shown in Figures 1 through 7 and are therefore not again described.

While I have described preferred embodiments of my invention, it will be understood that many modifications may be made within the spirit thereof. For example, it is not necessary that the bezel rings be rectangular as described, since obviously if a round tube were used and a round picture desired to be framed, the bezel rings would be correspondingly shaped. Additionally, of course, the exact shape of the spring clips 18, 24 and 29 may be modified as may be the specific form of the bezel rings. I wish therefore not to be limited by the foregoing description, but on the contrary solely by the claims granted to me.

What is claimed is:

1. In a television receiver having a cathode ray tube mounted behind an aperture in a cabinet front and a safety glass between the cathode ray tube and an observer thereof, in combination, a picture masking ring affixed to the cabinet front and abutting the periphery of the face of the cathode ray tube, a safety glass, means cooperating with the cabinet front and said masking ring for holding said safety glass in place in front of the cathode ray tube and a bezel ring removably fixed to said cabinet in front of said first masking ring, said bezel ring concealing the safety glass holding means, said masking and bezel rings having portions sloping inwardly toward the face of the cathode ray tube, said portions being in alignment whereby said rings appear to be a single ring.

2. A device as claimed in claim 1, characterized in that said masking ring has portions extending parallel to the plane of said safety glass, and further characterized in that said safety glass holding means comprises stud bolts affixed in the cabinet front, clamping members positioned on said bolts and nuts exerting pressure against said members to clamp the safety glass between said members and said parallel portions of said masking ring 3. A device as claimed in claim 1, characterized in that said bezel ring is provided with a portion overlying the aperture in the cabinet front, said overlying portion being provided with a peripherally extending groove, said device further comprising spring clips pressed into said groove at spaced points therealong and notches in the periphery of the cabinet front aperture into which said spring clips are inserted to hold said bezel ring in place.

4. A device as claimed in claim 3, characterized in that said spring clips are provided with serrated edges which cooperate with the walls of said peripheral groove in said bezel ring to hold said clips permanently in place therein.

5. A device as claimed in claim 3, characterized in that said spring clips are provided with a U-shaped bend at the rearward end thereof which bend enters into said notches in said cabinet to thereby hold the outer bezel ring in place.

6. A device as claimed in claim 3, characterized in that the rim of said bezel ring is provided with notches in the rearwardly facing edge thereof to provide for a finger grip in removing said bezel from the cabinet.

7. A device as claimed in claim 1, characterized in that said bezel ring is provided with a rim extending over the edge of the aperture in the cabinet front and is also provided with an inwardly extending flange, said flange being provided at spaced points with openings therein and spring clips affixed to said television cabinet front adjacent the aperture therein, said clips being adapted to cooperate with said openings to clamp said bezel ring in place.

References Cited in the file of this patent

UNITED STATES PATENTS

| Number | Name | Date |
| --- | --- | --- |
| 2,470,620 | Jackson | May 17, 1949 |
| 2,531,537 | Simpkiss | Nov. 28, 1950 |

OTHER REFERENCES

"Rider Television Manual," vol. #2, Philco TV, page 2–150.

Wright Abstract No. 719,175, published August 23, 1949.